United States Patent [19]

Urino

[11] Patent Number: 4,991,937
[45] Date of Patent: Feb. 12, 1991

[54] BIREFRINGENCE DIFFRACTION GRATING TYPE POLARIZER

[75] Inventor: Yutaka Urino, Tokyo, Japan
[73] Assignee: NEC Corporation, Tokyo, Japan
[21] Appl. No.: 371,899
[22] Filed: Jun. 27, 1989

[30] Foreign Application Priority Data

Jun. 29, 1988 [JP] Japan .................................. 63-164049

[51] Int. Cl.$^5$ ........................... G02B 5/18; G02B 5/30
[52] U.S. Cl. ............................... 350/401; 350/162.17; 350/166
[58] Field of Search ............... 350/385, 386, 400, 334, 350/342, 164, 96.19, 96.12, 162.11, 162.17, 162.2, 401, 166

[56] References Cited

U.S. PATENT DOCUMENTS

| | | | |
|---|---|---|---|
| 4,228,449 | 10/1980 | Braatz | 350/334 |
| 4,355,866 | 10/1982 | Tanaka et al. | 350/164 |
| 4,359,260 | 11/1982 | Reinhart et al. | 350/385 |
| 4,609,267 | 9/1986 | Deguchi et al. | 350/164 |
| 4,619,501 | 10/1986 | Armitage | 350/386 |
| 4,655,554 | 4/1987 | Armitage | 350/386 |
| 4,784,467 | 11/1988 | Akatsuka et al. | 350/164 |
| 4,826,300 | 5/1989 | Efron et al. | 350/342 |
| 4,842,376 | 6/1989 | Braatz et al. | 350/342 |
| 4,881,110 | 11/1989 | Braatz et al. | 350/342 |

OTHER PUBLICATIONS

Jackel et al., "Proton Exchange For High-Index Waveguides In LiNbO$_3$," *Applied Physics Letters*, vol. 41, No. 7, Oct. 1, 1982, pp 607–608.
National Conference Record, 1982, Optical & Radio Wave Electronics, the Institute of Electronics & Communication Engineers of Japan, Part 2 (pp. 2-79).

*Primary Examiner*—Bruce Y. Arnold
*Assistant Examiner*—Martin Lerner
*Attorney, Agent, or Firm*—Sughrue, Mion, Zinn, Macpeak & Seas

[57] ABSTRACT

In a birefringence diffraction grating type polarizer, periodical proton ion-exchanged regions are provided on the principal plane of an optically anisotropic crystal substrate to provide an optical diffraction grating, and a dielectric layer is provided on each of the periodical proton ion-exchanged regions. The refractive index of the dielectric layer is proximate or equal to that of the crystal substrate, and the whole surface of the optical diffraction grating is covered by an anti-reflection layer of a single material having a uniform thickness.

5 Claims, 1 Drawing Sheet

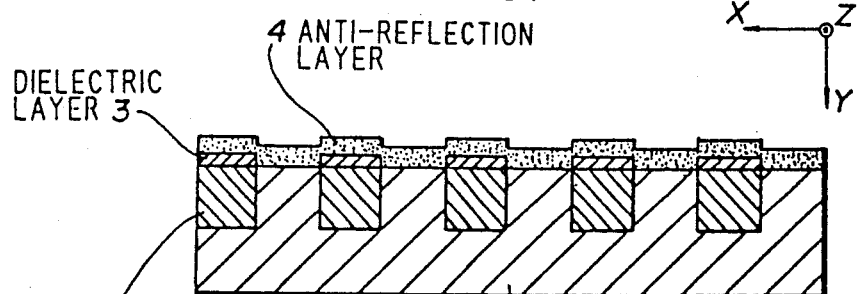
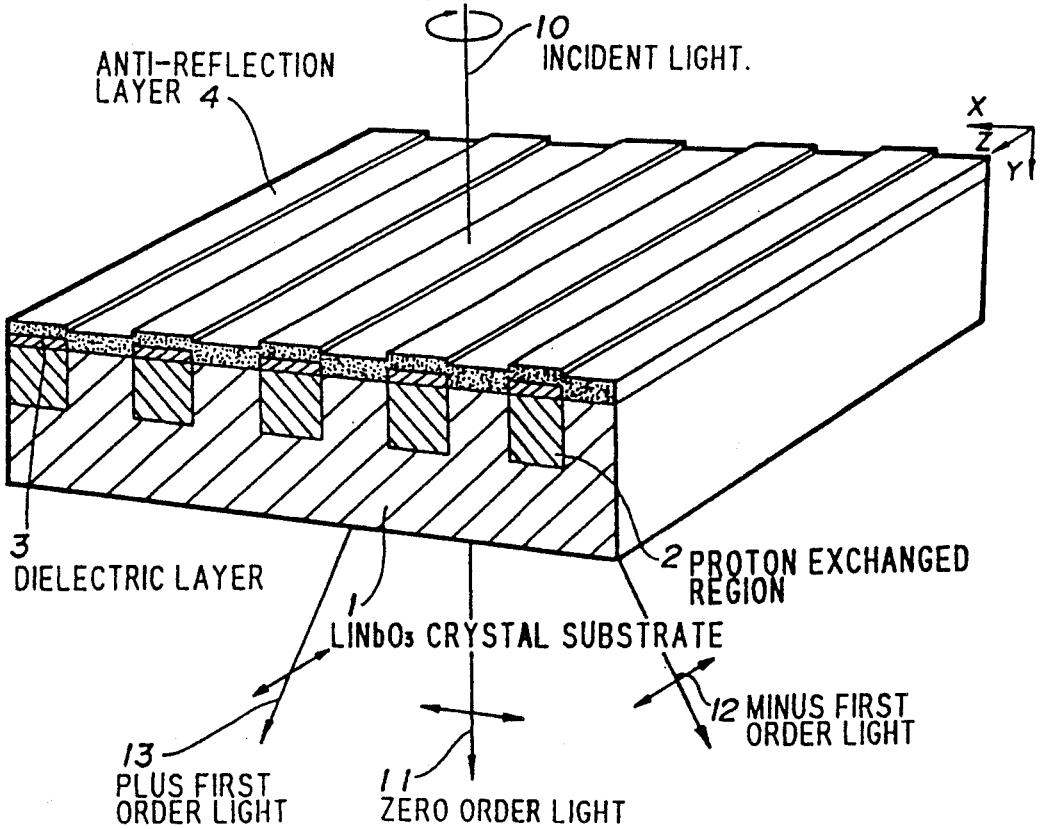

BIREFRINGENCE DIFFRACTION GRATING TYPE POLARIZER

FIELD OF THE INVENTION

This invention relates to a birefringent polarizer useful for various optical instruments making use of a LASER diode, and more particularly to a grating type polarizer having different diffraction efficiencies depending on the direction of polarization.

BACKGROUND OF THE INVENTION

A polarizer element, particularly a polarizing beam splitter, is an element in which a specific polarized light is obtained by changing the direction of light propagation between polarized lights perpendicular to each other. Such an element is used as a component for constructing an optical isolator or an optical circulator in a light source module for an optical fiber communication system, an optical head for an optical disc and so on.

A conventional polarizing beam splitter such as Glan-Thompson prism or Rochon prism is an element in which a light path is split based on the difference between the refraction angles or the total reflection angles of two orthogonally polarized light components at the reflection plane of a crystal with large birefringence, or an element in which light is totally reflected or transmitted in accordance with the difference of refractive indices of polarization light in multilayer dielectric film formed at the reflection plane of a total reflection prism consisting of an isotropic optical medium, such as glass.

According to the conventional polarizer element, however, there is a disadvantage that the size is large because the configuration is a cube having a side as long as $\sqrt{2}$ times a diameter of a transmitting light beam. This is because the conventional polarizer element has a reflection boundary surface which is positioned to be slant relative to a light axis by at least 45 degrees. In more detail, where the conventional polarizer element is applied to an optical disc for recording and reproducing, a transmitting light beam is large in size, so that the configuration is a cube having a side of 8 to 10 mm.

Another type of a conventional polarizer element is disclosed in "National conference record, 1982, Optical & Radio wave Electronics, the Institute of Electronics & Communication Engineers of Japan, Part 2". The conventional polarizer element consists of a birefringent tapered plate of Rutile ($TiO_2$) having a tapered angle of 4 degrees. When parallel light beam is incident to the birefringent tapered plate on one side thereof, the parallel light beam is subject to different refractions between an extraordinary ray component and an ordinary ray component, so that the two components are split on the other side of the birefringent tapered plate with a split angle of approximately 1 degree.

According to the birefringent tapered plate, however, there is a disadvantage that a fabricating process is complicated because the cutting of a tapered configuration is difficult on a mass-production basis, and the polishing of a tapered surfaces is also difficult to be carried out. There is a further disadvantage that Rutile is expensive.

SUMMARY OF THE INVENTION

Accordingly, it is an object of the invention to provide a birefringence diffraction grating type polarizer, the size of which is small.

It is a further object of the invention to provide a birefringence diffraction grating type polarizer which is of a low material cost.

It is a still further object of the invention to provide a birefringence diffraction grating type polarizer which is fabricated by a simple process.

According to the invention, a birefringence diffraction grating type polarizer comprises, an optically anisotropic sheet crystal substrate having periodical ion exchanged regions to provide an optical diffraction grating;

dielectric layers provided over the ionexchanged regions, and having a refractive index proximate or equal to that of the crystal substrate; and an anti-reflection layer of a uniform thickness provided over the whole surface of the crystal substrate and the dielectric layers.

BRIEF DESCRIPTION OF THE DRAWINGS

The invention will be explained in more detail in conjunction with appended drawings wherein, FIG. 1 is a cross-sectional view showing a birefringence diffraction grating type polarizer in an embodiment according to the invention, and FIG. 2 is a perspective view of the polarizer of FIG. 1.

DESCRIPTION OF THE PREFERRED EMBODIMENTS

Before explaining a birefringence diffraction grating type polarizer in an embodiment according to the invention, the principle of the invention will be briefly explained.

According to the invention, the reflection between a crystal substrate and a dielectric film is negligible because the dielectric film has a refractive index proximate to that of the crystal substrate as described above in a polarizer of the birefringence diffraction grating type. Therefore, the surface of the polarizer is optically to be equivalent to the surface of a single substance. Accordingly, an anti-reflection layer can be provided by simply depositing a usual anti-reflection layer of a uniform thickness on the crystal substrate. This simplifies significantly the fabricating process for growing the anti-reflection layer. Moreover, the phase condition of a diffraction grating is free from disturbance, because the thickness of the anti-reflection layer is uniform, so that the decrease of an extinction ratio and the increase of a diffraction loss which are usually resulted from the presence of an anti-reflection layer can be avoided.

Next, a birefringence diffraction grating type polarizer in the embodiment according to the invention will be explained in FIGS. 1 and 2. A crystal substrate 1 having optical anisotropy is a Y cut sheet of lithium niobate ($LiNbO_3$) in this embodiment. A series of proton exchanged regions 2 are provided periodically on the substrate 1. On these proton exchanged regions 2, dielectric film 3 each having a refractive index proximate or equal to that of the substrate 1 is formed, thereby providing an optical diffraction grating. Dielectric substances having such refractive indices are exemplified by lithium niobate ($LiNbO_3$), niobium pentoxide ($N_2O_5$), zirconium dioxide ($ZrO_2$), zinc sulphide ($ZnS$), titanium dioxide ($TiO_2$), cerium dioxide ($CeO_2$), tantalum pentoxide ($Ta_2O_5$) and tellurium dioxide ($TeO_2$). An anti-reflection film 4 of a uniform thickness is provided on the substrate 1 and on the dielectric films 3. This anti-reflection film 4 consists of a material having a refractive index proximate to the square root value of a refractive index of the substrate 1, and has the uniform thickness equal to a dimension obtained in the calculation in which a light wavelength is divided by a value four times a refractive index of the anti-reflection film 4.

A material having such a refractive index is selected from, for instance, silicon dioxide ($SiO_2$), calcium fluoride ($CaF_2$), aluminum fluoride ($AlF_3$), lanthanum fluoride ($LaF_3$), strontium fluoride ($SrF_2$) and magnesium fluoride ($MgF_2$). The anti-reflection film 4 having such a refractive index reduces a reflection factor between the substrate 1 and the air to "zero", preventing the reflection on portions without the dielectric layer 3. Further, the reflection induced at the boundary between the substrate 1 and the dielectric layer 3 is reduced to be almost "zero" because their refractive indices are almost equal to each other, and the reflection between the dielectric film 3 and the air is reduced to be almost "zero" in the presence of the anti-reflection layer 4 which is provided between the substrate 1 and the air. Therefore, the reflections on the two different substances of the polarizer surface composed of the substrate 1 and the dielectic film 3 are prevented simultaneously by simply depositing the anti-reflection film 4 of a uniform thickness. This anti-reflection film 4 may be composed of multiple layers providing an equivalent phase shift. In the case where the surface of the grating is in contact with an external material other than the air, a refractive index of the anti-reflection film 4 may be nearly equal to the square root value of the product between the refractive index of the external material and that of the substrate 1.

In FIG. 2, an incident light 10 of a circular polarization is split as a zero order diffraction light 11 of a polarization along the x-axis, and plus and minus order diffraction lights 12 and 13 of a polarization orthogonal to the polarization of the zero order light 11.

The intensity of the zero order diffraction light 11 of this diffraction grating is given by the equation, $$\cos^2[nT_p+(nd-1)T_d]/\lambda$$

where $\lambda$ represents a wavelength of light, n represents the change in the refractive index by the proton exchange, $T_p$ represents the depth of the proton exchanged regions 2, $n_d$ represents the refraction index of the dielectric film 3, and $T_d$ represents the thickness of the dielectric film 3. Assuming that the wavelength of light is 1.3$\mu$m, then the refractive index of the substrate 1 of lithium niobate is about 2.2, and the change in the refractive index in accordance with the proton exchange is about +0.10 for the extraordinary ray, and is about −0.04 for the ordinary ray. Therefore, the depth of the proton ionreplacement regions 2 is about 4.6$\mu$m, and the thickness of the dielectric films 3 is about 0.16$\mu$m, where niobium pentoxide ($Nb_2O_5$) having the refractive index of about 2.2 is used for the dielectric layer 3, so that the intensity of the zero order diffraction light 11 of this grating can be "0" for the extraordinary ray, and "1" for the ordinary ray, whereby the grating functions as a polarizer. If $SiO_2$ layer giving the refractive index of 1.45 is used as the anti-reflection layer 4, the thickness of the $SiO_2$ layer should be about 2200Å.

The proton exchanged regions 2 of 4.6$\mu$m in depth can be provided by immersing the lithium niobate substrate 1 in liquified benzoic acid, for example, at 250° C. for four and a half hours. The niobium oxide film 3 of about 0.16$\mu$m in thickness can be provided by sputtering from a $Nb_2O_5$ target, or by reactive sputtering from a Nb target in oxygen environment. The $SiO_2$ layer 4 of 2200Å in thickness can be provided by ordinary sputtering.

The angle of diffraction is almost reversely proportional to the pitch of the diffraction grating. Hence, the pitch of the grating is determined so as to obtain the angle of diffraction greater than that required for separating the diffracted light from the non-diffracted light. For instance, the angle of diffraction is 0.74° for the pitch of 100$\mu$m, and is 7.5° for the pitch of 10$\mu$m, respectively, where the wavelength is 1.3$\mu$m.

According to the invention, a polarizer which is thin and of a low price can be obtained, since it can be fabricated from a thin lithium niobate sheet crystal in a mass by batch process.

According to the invention, as described above, light reflection can be avoided simply by disposing an anti-reflection layer of a single material having a uniform thickness on a substrate provided with periodical proton exchanged regions thereon, thereby simplifying a fabricating process thereof. The uniform thickness of the anti-reflection layer prevents the disturbance of the phase condition in the diffraction grating, so that a sheet type polarizing element with a high extinction ratio and a low insertion loss is readily obtained.

Although the invention has been described with respect to specific embodiment for complete and clear disclosure, the appended claims are not to thus limited but are to be construed as embodying all modification and alternative constructions that may occur to one skilled in the art which fairly fall within the basic teaching herein set forth.

What is claimed is:

1. A birefringence diffraction grating type polarizer: comprising,
   an optically anisotropic sheet crystal substrate having periodical ion-exchanged regions to provide a birefringence diffraction grating which functions as a polarizer;
   dielectric layers each provided over each of said ion-exchange regions, and having a refractive index proximate or equal to that of said crystal substrate; and
   an anti-reflection layer of a uniform thickness provided over the whole surface of said crystal substrate and said dielectric layers.

2. A birefringence diffraction grating type polarizer as defined in claim 1,
   wherein said dielectric layers are of a substance selected from lithium niobate, niobium pentoxide, zirconium oxide, zinc sulphide (ZnS), titanium dioxide ($TiO_2$), cerium dioxide ($CeO_2$), tantalum pentoxide ($Ta_2O_5$) and tellurium oxide.

3. A birefringence diffraction grating type polarizer as defined in claim 1,
   wherein said anti-reflection layer is of a material of a refractive index nearly equal to the square root value of the refractive index of said sheet crystal substrate.

4. A birefringence diffraction grating type polarizer as defined in claim 3,
   wherein said anti-reflection layer is of a thickness determined in the calculation in which a light wavelength is divided by a value four times the refractive index of said anti-reflection layer.

5. A birefringence diffraction grating type polarizer as defined in claim 3,
   wherein said anti-reflection layer is of a material selected from silicon dioxide, calcium fluoride ($CaF_2$), aluminum fluoride ($AlF_3$), lanthanum fluoride ($LaF_3$), strontium fluoride ($SrF_2$) and magnesium fluoride.

* * * * *